United States Patent [19]
Miller et al.

[11] 3,896,585
[45] July 29, 1975

[54] FURNACE OR THERMAL BLACK IN DEGRADABLE AGRICULTURAL MULCH

[75] Inventors: Richard Miller, Belle Mead; Murray H. Reich, Princeton, both of N.J.

[73] Assignee: Princeton Chemical Research, Inc., Princeton, N.J.

[22] Filed: Feb. 14, 1974

[21] Appl. No.: 442,718

Related U.S. Application Data

[63] Continuation-in-part of Ser. No. 284,327, Aug. 28, 1972, abandoned.

[52] U.S. Cl............. 47/9; 260/45.7 R; 260/DIG. 43
[51] Int. Cl................................................ A01g 7/00
[58] Field of Search ........ 47/9; 260/DIG. 43, 45.85, 260/45.95, 93.7, 45.7 R

[56] References Cited
UNITED STATES PATENTS

| | | | |
|---|---|---|---|
| 3,299,568 | 1/1967 | Tobolsky et al. | 47/9 |
| 3,320,695 | 5/1967 | Moore | 47/9 |
| 3,454,510 | 7/1969 | Newland et al. | 47/9 X |
| 3,590,528 | 7/1971 | Shepherd | 47/9 |
| 3,592,792 | 7/1971 | Newland et al. | 47/9 X |
| 3,679,777 | 7/1972 | Lambert | 47/9 X |
| 3,795,654 | 3/1974 | Kirkpatrick | 47/9 X |
| 3,828,471 | 8/1974 | Anderson | 47/9 |
| 3,839,311 | 10/1974 | Guillory et al. | 47/9 X |

*Primary Examiner*—Robert E. Bagwill
*Attorney, Agent, or Firm*—Burgess, Dinklage & Sprung

[57] ABSTRACT

In a degradable agricultural mulch comprising a degradable film of polybutene-1 or polypropylene which is at least about 40% isotactic, which film is about 0.4 to 20 mils thick and has a TALU rating of less than about 75,000 TALU, the improvement which comprises incorporating therein about 0.04 to 2% by weight of a stabilizer and about 0.05 to 5% by weight of furnace or thermal black having a particle size of about 200 to 800 A.

6 Claims, No Drawings

FURNACE OR THERMAL BLACK IN DEGRADABLE AGRICULTURAL MULCH

This is a continuation-in-part of application Ser. No. 284,327, filed Aug. 28, 1972, now abandoned.

This application relates to a degradable polyolefin film especially suited for use as an agricultural mulch.

The mulching of plants to improve their growing conditions is a practice that dates back to very early agriculture. Mulching vegetables can increase crop yields, promote earlier harvest and reduce fruit defects when the plant is growing under less than ideal conditions. Mulching can also reduce weed growth and keep the vegetables clean.

Mulch can be defined as any substance such as straw, sawdust, plastic, or paper spread on the ground to protect the roots of plants from heat, cold, or drought, or to keep fruit clean. Moreover, mulch modifies the soil and air microclimate in which a plant is growing. When mulches improve the environment in which a plant is growing, better growth and higher yields will normally be the end result.

The most commonly used mulch materials are synthetic, namely, plastic film 1 or 1½ mils thick and 3 to 6 feet wide. Plastic film, especially polyolefin film, is inexpensive and easily applied to the planting rows with machines. Black, opaque plastic film is used to control weed growth without resorting to the additional cost and labor of chemical herbicides application.

The changes brought about in the growing plant environment by mulching have the greatest influence on crop development during periods when growing conditions are less than ideal. Weather conditions that commonly result in plant stresses are low rainfall, cool air temperature and cool soil temperature. Mulching may help alleviate these stresses. Moreover, mulch also creates a physical barrier that controls weeds (or weed growth), evaporation, leaching, soil compaction and root pruning.

Mulches reduce the evaporation of water from the soil by 10 to 50 percent or more. Mulches also save water for use by the crop plant by reducing competition from weeds, which is very important in dry seasons.

Mulching modifies soil temperatures but black or grey mulches normally do not noticeably increase soil temperatures. Low soil temperatures during the spring growing season may reduce plant growth and early yields. During the mid-summer heat, however, soils cooled by mulches are often more productive.

Certain mulches reduce weed growth and the competition of weeds for light, water and nutrients. Opaque plastic mulches prevent light penetration necessary for weeds to grow. If transparent to clear synthetic plastic mulches are used, a selective herbicide or soil fumigation is necessary to control weeds germinating under the mulch.

Mulching helps maintain good soil structure by preventing soil crusting and compaction. Mulched soil remains loose and friable, thereby providing good aeration for plant roots. An extensive root system develops in mulched soil, especially in the upper 2 inches where drying of unmulched soil, crusting and cultivation often limit root growth. The mulch provides a physical barrier that prevents root pruning and injury by cultivation and hoeing. These factors contribute to a healthy root system and more efficient use of nutrients.

With mulching, the biological activity of soil microorganisms is increased due to the loose, well-aerated soil condition and uniform moisture, and higher uniform temperatures. This results in a more rapid breakdown of organic matter in the soil and the release of plant nutrients for crop growth.

Mulches reduce wind and water erosion of the soil. The synthetic plastic mulch provides an ideal situation for soil fumigation to ward off, for example, parasitic nematodes. Weeds provide conditions that are conducive to plant disease outbreaks. Cultivation is difficult and damage to vines may occur. The synthetic mulch films are practically impervious to carbon dioxide. This gas is of prime importance in photosynthesis and is taken in through pores (stomata) located most generally in the lower surface of the leaf. It has been shown that very high levels of carbon dioxide build up under the plastic film. As the film does not allow the gas to penetrate, it has to expire through the hole made in the film for the plant and a "chimney effect" is created, supplying $CO_2$ to the actively growing young leaves.

The product from a mulched crop is cleaner and fruit rot is reduced. Rain or irrigation cannot splash soil on the vines or fruit.

Up to very recently, the use of polyethylene film was seriously limited due to the fact that it does not decompose when in contact with the soil and when exposed to the elements, and it must be removed at the end of the crop season. Otherwise, the film will remain in the soil to become entangled in tillage equipment, interfere with precision planting and seeding, and be an unsightly nuisance for many years to come. The removal of the film from the rows, the subsequent destruction by incineration and the incremental costs in time and labor have limited the acceptance of polyethylene mulch film for commercial use.

The development of a degradable plastic mulch film as described in U.S. Patent application Ser. No. 93,393, filed Nov. 27, 1970, eliminates the basic flaw in the commercial utilization of plastic mulches.

The use of black, opaque plastic film mulches gives all of the benefits described above with the additional benefit of weed control. Crops grown under black mulch are virtually weed free and no fumigants or herbicides are required as is the case with clear or translucent mulches. With the latter, the soil must be treated with a chemical agent prior to or at the time of placing the film on the ground. The seeding of such ground must be postponed until any potential harmful effects of the chemical agents have subsided so that there are no detrimental effects on crop seeds or young transplants. Black film mulch virtually eliminates the growth of all weeds by screening out the ultraviolet radiation from incident sunlight so necessary for any plant growth. To those skilled in the art, carbon black is by far the best light screen and especially carbon channel black, which offers the highest degree of ultraviolet protection of any pigment commonly used in the formulation of plastics and paints, and for articles intended for long term outdoor exposure. A carbon black particle consists of many carbon atoms in fused aromatic rings, usually with oxygen-containing functional groups at the surface. It is these active oxygenated centers that cause carbon black to function as a very effective anti-oxidant with polyolefins. Carbon black, especially channel black, is also known to form synergistic combinations with sulfur-containing anti-oxidants to provide enhanced resistance to photo-oxidation. The particle size of the dispersed carbon black and the degree of agglomeration in the polymer matrix also influences the ultraviolet screening efficiency.

The addition of carbon black to such prior polyolefin mulches has been found, however, to produce a corresponding increase in stability of the film, i.e., a decrease in the degradability.

It is accordingly an object of the invention to realize the advantages of a black, degradable polyolefin mulch without significantly impairing such degradability.

These and other objects and advantages are realized in accordance with the present invention pursuant to which there is incorporated into a degradable film of polybutene-1 or polypropylene which is at least about 40% isotactic, which film is about 0.4 to 20 mils thick and has a TALU rating of less than about 75,000 TALU, about 0.04 to 2% by weight of a stabilizer and about 0.05 to 5% by weight of furnace or thermal black having a particle size of about 200 to 800 A.

Furnace combustion and furnace thermal blacks useful in this invention generally have a particle size of about 150 to 3,000 A in diameter, and preferably about 200 to 800 A in diameter, have a pH of about 7 to 10, and have an oxygen content of more than about 1.3% by difference.

Channel black carbon is noted for its high tinctorial power and gives excellent weed control in mulch films. Unfortunately, however, channel type carbon used at concentrations in film required for weed control prolongs the degradation time of the film beyond useful periods so that the benefit of degradability at the end of the growing season is lost. Surprisingly, however, it was found that the concentrations of furnace or thermal type carbon black required for weed control do not delay the degradation time and useful agricultural mulch compositions can be prepared utilizing this type of carbon.

Thus, plastic agricultural mulch film can be formulated to provide complete weed control under the most favorable growing conditions, and yet degrade and decompose at a predicted time, usually coincident with the completion of the last harvest, thus eliminating the need for fumigation and ultimate removal of the mulch film from the crop rows. After fulfilling its useful function as a mulch, the film degrades at a predicted time, regulated by the total number of thermally adjusted Langley units (TALU) of exposure, to a friable substance which crumbles to a powder. The powder is ultimately consumed by the action of soil microorganisms.

Furnace black is made by the partial combustion or a combination of combustion and thermal cracking of natural gas or vaporized liquid hydrocarbons. Channel black is produced by the incomplete combustion of natural gas in small flames, which impinge on cooled channel irons. Thermal blacks, similar to furnace blacks, are made by thermally cracking natural gas by a cyclic process in a furnace previously heated by the combustion of a gas-air mixture. In general, the furnace blacks have a larger particle size than the channel blacks and are greyer and weaker in masstone and tint. The channel blacks have a lesser tendency to agglomerate and this dispersibility as well as its ability to form synergistic combinations gives rise to improved ultraviolet protection especially in the shorter wave lengths. Further properties of and distinctions between the various carbon blacks are set out in detail in Rubber Chemistry and Technology, pages 1,404–1425 (1957), the disclosure of which is incorporated herein by reference.

The incorporation of the carbon black with the polymer matrix is readily accomplished by methods well known to those familiar with plastic processing. The carbon, in a concentration range of about 0.05 to 5%, especially about 0.1 to 3% and preferably about 1 to 2%, by weight of the polymer is blended or mixed with the base polymer in the form of powder, pellets and plastic. This blending operation is readily accomplished in standard dry-blend equipment such as ribbon blenders or tumble blenders, or in intensive dry blenders such as the Henschel or Pappenmeier mixer. Alternately, the carbon may be dispersed in the polymer by intensive mixing in the melt stage using Banbury mixers, extrusion compounding tooling or two-roll mill. The formulated polymer containing the carbon and other ingredients such as stabilizers, antioxidants, slip and block agents, may be extruded into rods or tapes and pelletized for subsequent use. Alternately, the fluxed composition may be sheeted off directly through an extruder with sheeting die or through a blown-film die.

Fabrication of the film, suited for use as mulch, is normally carried out on conventional extrusion blown film equipment. Pellets formulated as described above are fed by way of the hopper and extruded to a suitable parison which is expanded by blowing to a tube and stretching about 3.5 to 4 times in diameter. The tube is collapsed in a standard frame through a nip roll and the layflat is end slit to form two continuous sheets of 3–6 ft. width. The film is rolled upon a tension controlled double turret winder and packaged for distribution. The finished film thickness generally ranges from about 0.4 to 20 mils, although it may be as much as 40 mils or even more. In place of being flat it may be shaped three dimensionally to enclose, contain or conform to material to be protected thereby.

The preferred polyolefin film materials are polypropylene and polybutene-1 which are more than about 40% isotactic. As employed herein these polymers may contain a minor amount, preferably less than about 20% by weight, of units of other monomers, such as other olefins, and the like. Amounts of furnace or thermal black carbon higher than that indicated, viz. about 5%, begin to impair film degradability significantly while amounts below about 0.05% do not adequately perform the weedkilling function.

The invention will be further described in the illustrative examples presented hereinbelow wherein all parts are by weight unless otherwise expressed.

In reporting exposure reference is made to Temperature-Adjusted Langley Units (TALU) since it has been found that the temperature of exposure also has an effect as defined in co-pending application Ser. No. 93,393. Such TALU are calculated in accordance with the following formula:

$$\text{Temperature-Adjusted Langley Units} = \frac{1}{E} \times \text{Measured Langley Unit}$$

wherein
$E = 10^{54.39} (459.7 + T_F)^{-19.88}$ or
$10^{49.32} (273.2 + T_C)^{-19.88}$ where $T_F$ or $T_C$ is the mean daily maximum temperature in degrees Fahrenheit or degrees Centigrade, respectively.

The following is a table of temperature correction factors corresponding to various mean daily maximum temperatures:

| Mean Daily Maximum Temp. °F | Temperature Correction Factor E |
|---|---|
| 30 | 8.47 |
| 40 | 5.66 |
| 50 | 3.82 |
| 60 | 2.60 |
| 70 | 1.78 |
| 80 | 1.228 |
| 90 | 0.851 |
| 100 | 0.594 |
| 110 | 0.418 |
| 120 | 0.275 |

The TALU rating of the films to be used will depend upon the rate of degradation required for the particular crop and local weather conditions. It will generally be less than about 75,000 and usually about 5,000 to 50,000, preferably about 7,000 to 40,000. The TALU rating will be established by the polymer, its thermal history and its composition. Whereas other degradable mulches such as the amorphous polyolefins of British Pat. Specification No. 1,052,998 operated by use of a pro-oxidant, the isotactic polyolefins herein involved perform quite differently. To permit their fabrication at relatively high temperatures but yet to give relatively low TALU ratings of reproducible values, it is generally necessary to incorporate a stabilizer into the composition, notwithstanding that the ultimate objective is degradation. The amount and identity of the stabilizer can be varied widely, e.g. about 0.005 to 2% by weight or more. Representative stabilizers are set forth in the examples hereinbelow; others are set forth in application Ser. No. 93,393, filed Nov. 27, 1970, now pending, the disclosure of which is incorporated herein by reference.

The films may range in thickness from about 0.4 to 20 mils, preferably about 0.8 to 10 mils and most preferably about 0.8 to 5 mils to give the desirable combination of sufficient strength to withstand the rigors of fabrication and placing in the field, low cost and ready and controllable degradation.

EXAMPLE 1

Samples of 1.5 mil isotactic polybutene-1 film containing 1% by weight of furnace carbon black sold by Cabot Corporation as Sterling V, and stabilized with 0.02% of tri(nonylated phenyl)phosphite and 0.2% of dilaurylthiodipropionate were exposed at Princeton, New Jersey starting on April 7. Elongations, tensile strengths and exposure in Langley units and temperature-adusted Langley units (TALU) were measured. After seven weeks of exposure to 11,600 TALU, the film was brittle. After eight weeks of exposure to 13,200 TALU of solar radiation, the film had degraded completely as evidenced by a tensile strength of 1480 lb./sq. in. and an elongation of 7%.

The same polybutene in the form of 1.7 mil film stabilized with the same antioxidant system but containing 1% of channel carbon black instead of furnace black was still tough after exposure to 34,200 TALU units as shown by a tensile strength of 4640 psi and an elongation of 76%.

EXAMPLE 2

A 4-foot wide polybutene film containing 1% of furnace carbon black and stabilized with 0.02% tri(nonylated phenyl)phosphite and 0.2% dilaurylthiodipropionate was prepared using commercial blown film equipment, slitting the film and winding the film onto 4-foot reels. The reels were transported to the experimental agricultural farm at the New Jersey State University. The black plastic film was laid mechanically on the ground on April 2 with the aid of a commercial mulch film applicator.

The plastic film conserved moisture, eliminated the need for hoeing, and prevented weed growth under the film. The black polybutene film started to degrade at the end of May and had degraded completely by the middle of June, eliminating the necessity of removing the film from the ground.

Neither clear polyethylene film nor black polyethylene film (containing 2.5% of channel black sold by the Cabot Corporation as Monarch 74) which had been laid down at the same time degraded during this period and the polyethylene films had to be removed manually from the field.

Also, a clear degradable polybutene film made according to Example 3 of U.S. Pat. application Ser. No. 93,393 degraded but did not control weed growth.

EXAMPLE 3

Polybutene film stabilized with 0.04% di-t-butyl-para-cresol and containing 0.9% of furnace carbon black was applied in early April to a field in New Jersey which had been seeded for tomato plants and to which no weed killer had been applied. By the middle of May, the tomato plants had come through the plastic and by the end of May the plastic film had degraded. The black film prevented the growth of weeds.

EXAMPLE 4

A black 4-foot wide polybutene film stabilized with 0.2% of tri(nonylated phenyl)phosphite, 0.2% of dilaurylthiodipropionate and 0.3% of 2(3', 5'-di-t-butyl-2-hydroxyphenyl) 5-chlorobenzotriazole and containing 1% of furnace carbon black was prepared using commercial blown film equipment; reels of the film were transported to a farm near Thorofare, New Jersey. The black film was laid on the ground in early spring. The plastic film conserved moisture, eliminated hoeing and prevented weed growth. The black polybutene film had started to degrade at the beginning of August and had degraded completely by early September, eliminating the need of removing the film from the ground. Neither clear nor black polyethylene film containing the same stabilizers but no carbon black had degraded during this period and the polyethylene films had to be removed manually from the field.

EXAMPLE 5

Samples of isotactic polypropylene film containing 0.5% of furnace carbon black and stabilized with 0.02% tri(nonylated phenyl)phosphite and 0.2% dilauryl thiodipropionate will degrade upon exposure at Princeton, New Jersey from early spring to July.

The films in Examples 2 to 5 were all 1.1 mils thick.

It will be appreciated that the instant specification and examples are set forth by way of illustration and not limitation and that various modifications and changes may be made without departing from the spirit and scope of the present invention.

What is claimed is:

1. In a degradable agricultural mulch comprising a degradable film of polybutene-1 or polypropylene which is at least about 40% isotactic, which film is about 0.4 to 20 mils thick and has a TALU rating of less than about 75,000 TALU, the improvement which comprises incorporating therein about 0.005 to 2% by weight of a stabilizer and about 0.05 to 5% by weight of furnace or thermal black having a particle size of about 200 to 800 A.

2. A film according to claim 1 of a thickness of about 0.8 to 10 mils, and comprising about 0.1 to 3% by weight of furnace or thermal black and at least about 0.04% by weight of a stabilizer.

3. A film according to claim 2 comprising about 1 to 2% by weight of furnace black.

4. A film according to claim 2 comprising about 1 to 2% by weight of thermal black.

5. A film according to claim 2 wherein said film comprises polybutene-1.

6. A film according to claim 2 wherein said film comprises polypropylene.

* * * * *